United States Patent [19]

Nonaka et al.

[11] Patent Number: 5,814,959
[45] Date of Patent: Sep. 29, 1998

[54] GYRO-MOMENT COMPENSATION CONTROL METHOD AND APPARATUS

[75] Inventors: Youichi Nonaka, Fujisawa; Shiyuki Sakaue, Hiratsuka, both of Japan

[73] Assignee: Hitachi, Ltd., Tokyo, Japan

[21] Appl. No.: 586,318

[22] Filed: Jan. 17, 1996

Related U.S. Application Data

[63] Continuation-in-part of Ser. No. 216,975, Mar. 24, 1994, Pat. No. 5,497,061.

[30] Foreign Application Priority Data

Mar. 31, 1993 [JP] Japan ..................................... 5-073343

[51] Int. Cl.$^6$ ............................ G05B 19/42; G06F 15/46
[52] U.S. Cl. .................................. 318/568.11; 318/568.1; 318/568.19; 318/568.22; 395/95; 395/97; 901/34; 901/45; 364/424.05
[58] Field of Search .................................... 318/560–599, 318/139, 649; 901/45, 46, 47; 364/424.02, 424.05, 424.01; 280/707, 840; 180/41; 395/83–99

[56] References Cited

U.S. PATENT DOCUMENTS

| | | | |
|---|---|---|---|
| 5,220,261 | 6/1993 | Kempas | 318/567 |
| 5,261,503 | 11/1993 | Yasui | 180/142 |
| 5,467,280 | 11/1995 | Kimura | 364/424.05 |
| 5,526,262 | 6/1996 | Kimura et al. | 364/424.05 |
| 5,540,298 | 7/1996 | Yoshioka et al. | 180/169 |

OTHER PUBLICATIONS

"Develoment of an Impeller Grinding Robot System and a Gyro–Moment Compensated Compliance Control", Y. Nonaka et al, Proceedings of 1995, IEEE International Conference on Robotics and Automation, Nagoya Congress Center, May 21–27, 1995, Japan, vol. 2 of 3.

*Primary Examiner*—Paul Ip
*Attorney, Agent, or Firm*—Antonelli, Terry, Stout & Kraus, LLP

[57] ABSTRACT

A method and apparatus for controlling a robot which performs an operation on an object while applying any desired force to the object, and a method of controlling automobile suspensions so as to maintain the contact between the automobile and a road surface appropriately. A robot controller which controls the motion of an end effector includes a rotating body, using an external force applied to the effector. The controller beforehand measures the tensor of inertia of the rotating body, calculates the angular momentum of the rotating body on the basis of a sensed value output from a unit for sensing the rotational speed of the rotating body and the tensor of inertia of the rotating body, calculates a gyro-moment occurring in the rotating body on the basis of a sensed value output from a sensor for sensing the motion of the robot and the angular momentum of the rotating body, and uses as a control input value the external force from a sensor for sensing value minus the value of the gyro-moment. An automobile suspension is controlled by an external force applied to a wheel of the automobile, using as a control input value a sensed value output from a sensor for sensing the external force minus the value of a gyro-moment occurring in the wheel.

8 Claims, 4 Drawing Sheets

5,814,959

GYRO-MOMENT COMPENSATION CONTROL METHOD AND APPARATUS

CROSS-REFERENCE TO RELATED APPLICATION

This application is a continuation-in-part of earlier filed application Ser. No. 08/216975 filed on Mar. 24, 1994, now U.S. Pat. No. 5,497,061, the subject matter of which is incorporated by reference herein.

BACKGROUND OF THE INVENTION

The present invention relates to methods and apparatus for controlling a robot which performs an operation on an object while applying force to the object and a method of controlling suspensions for an automobile so as to appropriately maintain contact of the automobile with a road surface.

When a machine operates an object while keeping contact with the object, there is used a method of controlling the machine and the object so as to maintain appropriate contact therebetween, using a force at a point of contact as an input value for control of the machine, more specifically, when the robot performs an assembling, boring or grinding operation or when suspensions of an automobile are controlled.

When a robot performs a boring or grinding operation on a workpiece, it must control a force applied to a rotating tool in accordance with a force at a point of contact between the tool and the workpiece. Conventionally, a sensor is provided for sensing a force between the rotating tool and the robot to calculate and obtain the force at the point of contact from the sensed force value. This force is used as a control input to control the force which the robot applies to the rotating tool.

When the suspensions of an automobile are controlled, contact between a road surface and the automobile must be maintained appropriately. Conventionally, a sensor which senses the force applied from the road to each of the wheels of the automobile when the automobile travels is provided in the appropriate suspension to control the rigidity of a spring of the suspension and the viscosity of a corresponding damper to maintain appropriate contact between the appropriate wheel and the road.

When the robot controls a force applied to a rotating tool, a gyro-moment occurs at the rotating tool depending on a change in the orientation of the tool. A sensor which obtains an external force at the point of contact between the workpiece and the tool is provided between the rotating tool and the robot. Thus, the sensor senses the external force at the point of contact as well as internal forces such as the gravity, inertial force and gyro-moment of the tool in a mixed state. Conventionally, in order to calculate the external force at the point of contact from the sensed value to obtain a control input, the gravity and inertial force of the tool are only subtracted from the sensed value. Thus, the calculated force contains the gyro-moment of the tool, so that the force is different from the actual external force at the point of contact. Thus, the robot can not appropriately control the force.

When the automobile suspensions control contact of the wheels with a road surface, a gyro-moment occurs at each of the wheels depending on a change in the orientation of that wheel. A sensor which obtains an external force at the point of contact between each of the wheels and the road surface is provided between that wheel and the automobile body. Thus, the sensor senses the external force at the point of contact as well as internal forces such as the gravity, inertial force and gyro-moment of the wheel in a mixed state. Conventionally, in order to calculate the external force at the point of contact from the sensed value to obtain a control input, the gravity and inertial force of the wheel are only subtracted from the sensed value. Thus, the calculated force contains the gyro-moment of the wheel, so that the calculated force is different from the actual external force at the point of contact. Accordingly, the respective suspensions can not appropriately be controlled so that the respective wheels may maintain appropriate contact with the road surface.

These problems arise from the fact that in the control in which the external force at the point of contact is used as an input value to maintain the appropriate contact, the force obtained only by subtracting the gravity force of the rotating body occurring between the sensor and the point of contact without subtraction of a gyro-moment occurring in the rotating body from the sensed output value of the external force sensor and the force is regarded as an external force occurring at the point of contact and used as an input value for controlling purposes.

SUMMARY OF THE INVENTION

It is therefore a main object of the present invention to provide a method and apparatus for obtaining an appropriate result of control over an object by calculating the gyro-moment from other means, and subtracting from the sensed value the gravity force, inertial force and gyro-moment of the rotating body occurring between the sensor and the point of contact to thereby obtain the external force at the point of contact and use the external force for controlling purposes.

According to the present invention, in the control in which the external force at the point of contact is used as an input value to maintain the appropriate contact state, the external force can be calculated appropriately from the sensed output value of the external force sensor even when the sensor can not directly sense the external force, so that control can be provided for maintaining the appropriate contact state. Especially, when a robot performs a boring or grinding operation on a workpiece, the robot can appropriately control a force applied to a rotating tool, using a force at the point of contact with the workpiece for working purposes. When the automobile suspensions are controlled, the contact state between the automobile and the road surface can be maintained appropriately, using the external force at the point of contact of a respective wheel with the road surface.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

The embodiments of the present invention will be described with reference to FIGS. 1–4.

Figure 1:
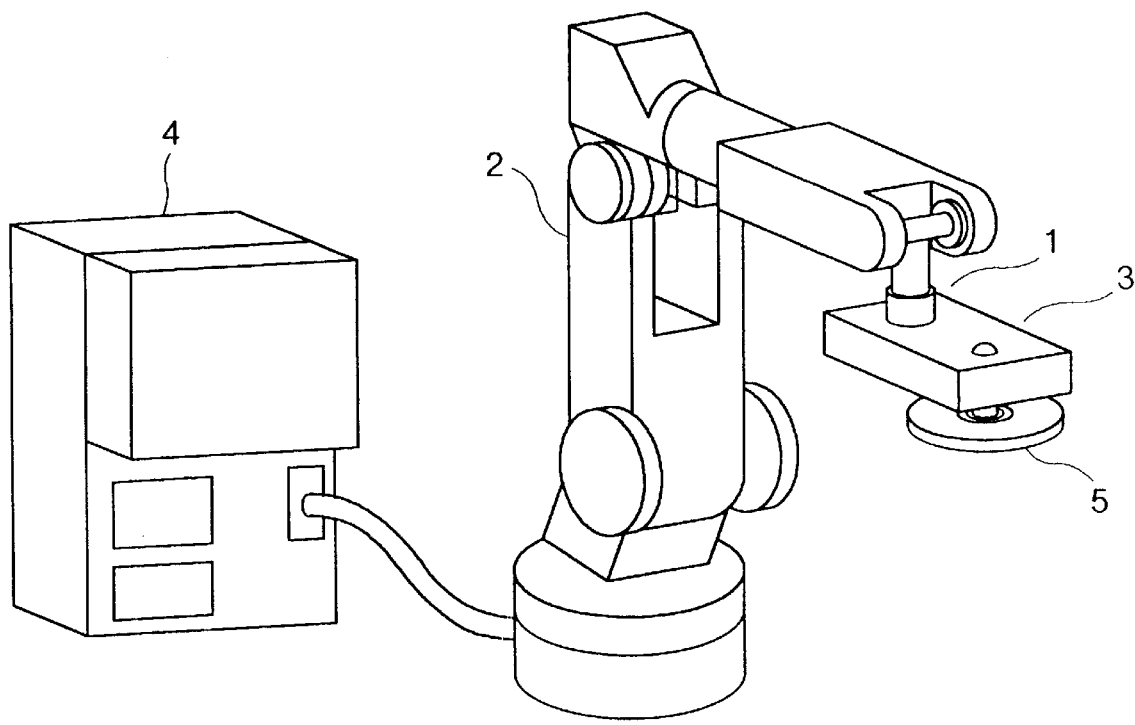
FIG. 1 shows an illustrative structure of a device which carries out the present invention.

FIG. 1 is an illustrative structure of a device which carries out the present invention. A force sensor 1 which senses a 3-degrees-of-freedom translation force and a 3-degrees-of-freedom moment is provided at a wrist of a 6-degrees-of-freedom multi-jointed robot 2. A grinder 3 is also attached as an end effector to the wrist. A rotational angle sensor which senses a rotational angle is attached to each of joins of the robot 2. The robot 2 is controlled by a controller 4 to thereby apply any desired mechanical compliance to the end effector. The force sensor 1 is not necessarily required to be provided between the robot 2 and the grinder 3, but may be provided between the grinder 3 and a grinder stone 5. By sensing the drive power of an electric motor provided at each of the joins of the robot and processing data on the drive power, the function of the force sensor 1 may be replaced.

The controller 4 of the robot 2 calculates a force occurring at a point of contact between the grinder 3 and a workpiece, using the force sensor 1, and controls the robot 2 in accordance with various control rules depending on the force at the point of contact. An example of the control rules is control of the respective joins of the robot 2 such that the grinder 3 has an appropriate mechanical compliance to the workpiece. Another example is control of the respective joins of the robot such that the grinder 3 applies an appropriate translation force and/or moment to the workpiece at the point of contact. In those examples, the objects to be controlled are not necessarily the respective joins of the robot 2, but a mechanism which is capable of performing a motion of at least one degree of freedom may be provided between the robot 2 and the force sensor 1 to control the force at the point of contact. In addition, in the two examples, the grinder 3 is not required to be necessarily put at all times in contact with the workpiece. Even when the grinder 3 is moved in the air, the control rules of the two examples may be applied to a virtual point of contact provided at the grinder 3.

A technique for controlling the robot for the force at the point of contact between the grinder 3 and the workpiece will be described next, using expressions below. In the following description, a parameter called a dual number is used to handle a translation force and a moment in a unified manner and the translation force and moment are referred to as forces, as shown in expression (1):

$$F = Q + eR \tag{1}$$

where
F: a force,
Q: a translation force,
R: a moment, and
e: a dual number.

As shown in expression (2), the force Fs sensed by the force sensor 1 is sensed as a resultant force of the external force Fo at the point of contact, the gravity force Fm of the grinder 3 between the force sensor 1 and the point of contact, the inertial force Fi of the grinder 3 between the force sensor 1 and the point of contact, and a gyro-moment Fg occurring in the rotor of the grinder 3 between the force sensor 1 and the point of contact:

$$Fs = Fo + Fm + Fi + Fg \tag{2}$$

where
Fs: the force sensed by the force sensor,
Fo: the external force at the point of contact,
Fm: the gravity force of the grinder between the force sensor and the point of contact,
Fi: the inertial force of the grinder between the force sensor and the point of contact, and Fg: the gyro-moment of the rotor between the force sensor and the point of contact.

What is used in the control is the force Fo at the point of contact and calculated by the following expression (3) which includes a modification of expression (2):

$$Fo = Fs - (Fm + Fi + Fg) \tag{3}$$

Since Fm, Fi and Fg can be calculated beforehand, the external force Fo at the point of contact can be calculated in accordance with expression (3).

Fo is used as an input value for the various control rules f(Fo) mentioned above, as shown in the following expression (4), and a command value for a motor which drives the robot 2 is calculated to control the robot:

$$f(Fo) = V \tag{4}$$

where f(Fo): a control rule for a controller for the robot 2, and
V: a command value for the motor which drives the robot 2.

In expression (3), Fm, Fi and Fg can be calculated in various manners. For example, Fm can be obtained by changing the orientation of the grinder 3 at least three times, and calculating the mass and center of gravity of the grinder 3 from the sensed values of the force sensor 1 in each of the orientations of the grinder 3. Fi can be calculated on the basis of the motion of the grinder 3 calculated from the outputs of rotational angle sensors provided at the respective joins of the robot 2 and the mass and center of gravity of the grinder 3 used when Fm of the grinder 3 was calculated. For Fg, the moment of inertia of the rotating body of the grinder 3 is calculated beforehand in accordance with the following steps. More particularly, a rotational speed sensor which senses the rotational speed of the grinder 3 is provided at the grinder 3. The grinder 3 is then rotated while the robot 2 is controlled to change the orientation of the grinder 3 in the air. The moment of inertia of the grinder rotating body 3 is beforehand calculated in the following expression (5), using the sensed value output from the force sensor 1 minus (Fi+Fm) as a value expressing the gyro-moment Fg:

$$Fg = W*[I]R \tag{5}$$

where W: the rotational speed of the grinder 3 having a changing orientation,
[I]: the inertia tensor of the rotating body of the grinder 3,
R: a sensed value output from the rotational speed sensor which senses the rotational speed of the grinder 3, and
\*: outer product operator.

Fg occurring when the grinder 3 performs a grinding operation is calculated on the basis of the rotational speed, a change in the orientation, and the inertia tensor of the rotating body of the grinder 3.

Conventionally, since the term Fg of the gyro-moment is neglected and not introduced into expression (3), and when an end effector having a mechanically large angular momentum such as the grinder 3 is used, the term of Fg prevails in expression (3) and the external force Fo at the point of contact can not be calculated appropriately. However, by introducing the term of Fg into expression (3) in the present invention, Fo is calculated appropriately to thereby control the robot 2 appropriately.

As described in a reference "Development of an Impeller Grinding Robot System and a Gyro-Moment Compensated Compliance Control" by Youichi Nonaka, Shiyuki Sakaue, Yoshihiro Yanagihara, Kenji Yokoshima; Production Engineering Research Laboratory Hitachi Corp., a device to which the present invention was applied was constituted to thereby prove the effectiveness of the present invention experimentally. The present device is constructed mainly as a robot which grinds the surface of an industrial impeller. The robot controls the contact force of the grinder as an end effector on the basis of the output from a force sensor provided at the wrist of the robot to thereby grind the workpiece. At this time, the present invention solves the problem that the sensed force of the force sensor and the contact force of the grinder cannot be calculated appropriately because a gyro-moment is produced by the angular momentum of the grinder.

Figure 2:
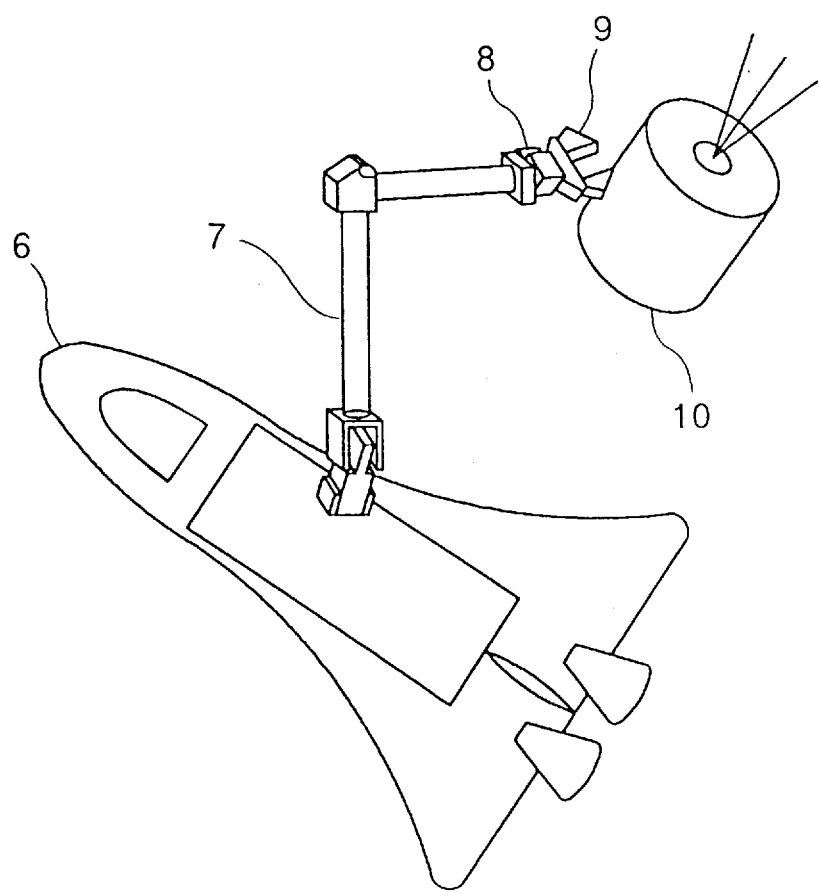
FIG. 2 shows an illustrative structure of a space manipulator to which the present invention is applied.

FIG. 2 shows a space manipulator to which the present invention is applied. Provided at the wrist of a manipulator 7 provided in a spacecraft 6 is a force sensor 8 which senses a 3-degrees-of-freedom translation force and a 3-degrees-of-freedom moment and a gripper 9 as an end effector. The gripper can be replaced as a grinder, a wrench, and other tools. The manipulator 7 is directly controlled by the spacecraft 6 or remotely controlled from the earth. At this time, the force sensor 8 senses a force at the point of contact between the gripper 9 and an object 10 to use the force as an input value for controlling purposes. When the object 10 includes a rotating body such as an orientation control gyro, and the manipulator 7 is controlled, a control system which allows for the mass and center of gravity of the object 10 as well as the influence of a gyro-moment must be constructed.

Figure 3:
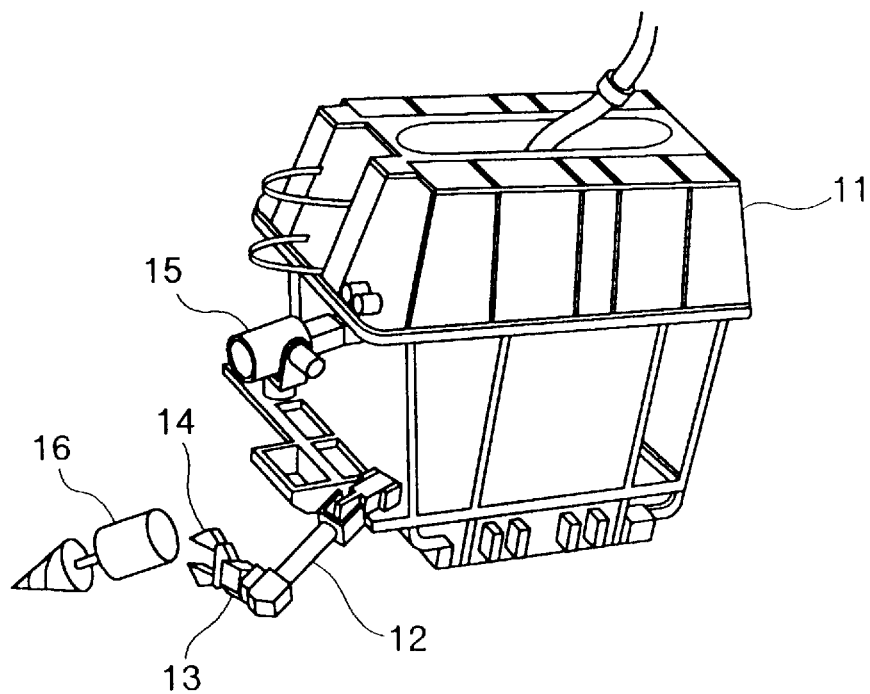
FIG. 3 shows an illustrative structure of a marine manipulator to which the present invention is applied.

FIG. 3 shows a marine robot to which the present invention is applied. Provided at the wrist of a manipulator 12 provided in the marine robot 11 is a force sensor 13 which senses a 3-degrees-of-freedom translation force and a 3-degrees-of-freedom moment and a gripper 14 as an end effector. The gripper can be replaced as a grinder, a wrench, and other tools. The manipulator 12 is directly controlled by the marine robot 11 or remotely controlled from a TV camera over the sea. At this time, the force sensor 13 senses a contact force between the gripper 14 and an object to use the force as an input value for controlling purposes. When the manipulator 12 is controlled such that the gripper 14 digs the sea bottom with a drill 16, a control system which allows for the mass and center of gravity of the drill 16 as well as the influence of a gyro-moment must be constructed. This applies also when the drill 16 is directly provided in place of the gripper 14.

Figure 4:
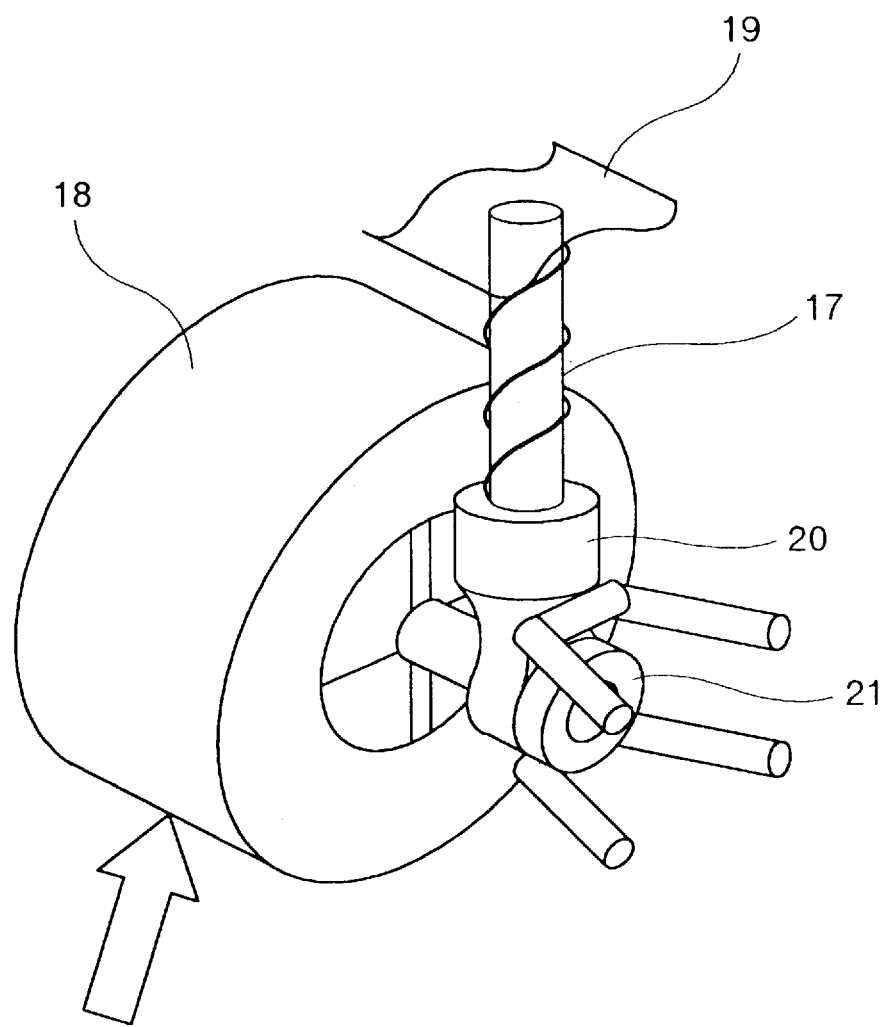
FIG. 4 shows an illustrative structure of an automobile suspension to which the present invention is applied.

FIG. 4 shows an automobile suspension to which the present invention is applied. The suspension 17 must be controlled such that it appropriately maintains contact between a wheel 18 and a road surface even when the road surface changes variously and that the automobile body 19 takes an appropriate orientation. Generally, the suspension 17 is composed of a damping device which includes a spring and a damper element and a link mechanism which controls the orientation of the automobile. A force sensor 20 which senses a force acting at the point of contact between the road surface and the wheel is set on the suspension. The contact force is used as an input to control the spring rigidity of the suspension 17, the viscosity of the dumper element and the motion of the link, using the contact force as an input value. The force sensor 20 may be provided between the suspension 17 and the wheel 18 or between the suspension 17 and automobile body 19. When the orientation changes while the wheel is rotating such as when the automobile turns along a curve, a gyro-moment is occurred in the wheel. Thus, in order to sense the force at the point of contact between the road surface and the wheel with the force sensor 20, a control system which allows for the influence of the gyro-moment according to the present invention must be constructed. To this end, a rotational speed sensor 21 which senses the rotational speed of the wheel 18 is provided, and a gyro-moment is calculated on the basis of the tensor of inertia of the wheel 18 calculated beforehand, rotational speed of the wheel 18 and the rotational speed of the wheel 18 depending on the changing orientation. The rotational speed of the wheel 18 depending on the changing orientation is calculated from the rotational speed of the steering wheel provided in the automobile body 19.

According to the present invention, the gyro-moment is calculated by other means. The gravity force inertial force and gyro-moment of the rotating body occurring between the sensor and the point of contact are subtracted from a sensed value output from the sensor to calculate an external force acting at the point of contact. The external force is used in the control to thereby provide an appropriate result of control.

When the robot performs a boring/grinding operation, the robot appropriately controls a force applied to the rotating tool, using a force at the point of contact between the rotating tool and the workpiece for working purposes.

In addition, when the automobile suspensions are controlled, the external force at the point of contact between the automobile and the road surface appropriately maintains contact between the automobile and the road surface.

What is claimed is:

1. A method of controlling a robot of a type including an end effector for contacting an object comprising the step of:
    sensing with a sensor a force representing external and internal force of the end effector;
    obtaining a force representing a gyro-moment generated from the end effector when the robot is moved;
    subtracting the obtained force from the sensored force, and obtaining a resultant force; and
    controlling the robot in accordance with the resultant force which represents a contact force of the end effector with the object.

2. A controller which controls the motion of an end effector including a rotating body, using an external force applied to the end effector, comprising:
    means for sensing an external force value of the external force applied to the end effector including means for measuring the tensor of inertia of the rotating body beforehand and calculating the angular momentum of the rotating body on the basis of a sensed value output from means for determining the rotational speed of the rotating body and the moment of inertia of the rotating body;
    means for calculating a gyro-moment value occurring in the rotating body on the basis of a sensed value output from means for determining the motion of the rotating body and the angular momentum of the rotating body; and
    means for providing as a control input value for controlling the motion of the end effector the external force value as sensed by the means for sensing minus the gyro-moment value.

3. A controller according to claim 2, wherein the controller is a robot controller.

4. A controller according to claim 2, wherein the rotating body is a wheel of an automobile.

5. A controller according to claim 4, wherein the controller controls an automobile suspension by an external force applied to the wheel of the automobile.

6. A suspension control method for controlling an automobile suspension by an external force applied to a wheel of the automobile, comprising the step of providing as a control input value for controlling the automobile suspension an external force value of the external force applied to the wheel as sensed by a sensor minus a gyro-moment value occurring in the wheel.

7. A suspension control method according to claim 6, further comprising the step of controlling the automobile suspension in accordance with the control input value.

8. An automobile suspension controlled by an external force applied to an automobile wheel, comprising:

means for sensing an external force value of the external force applied to the wheel including means for calculating the angular momentum of the wheel on the basis of a sensed value output from means for sensing the rotational speed of the wheel and the moment of inertia of the wheel;

means for calculating a gyro-moment value occurring in the wheel on the basis of a sensed value output from means for determining the attitude of the wheel and the angular momentum of the wheel; and means for providing as a control input value for controlling the automobile suspension the external force value as sensed by the means for sensing minus the gyro-moment value occurring in the wheel.

\* \* \* \* \*